(12) United States Patent
Steffens et al.

(10) Patent No.: US 7,463,668 B2
(45) Date of Patent: Dec. 9, 2008

(54) WAVELENGTH TUNABLE CAVITY WITH ROTATIONAL MOVEMENT

(75) Inventors: Wolf Steffens, Herrenberg (DE); Andreas Schmidt, Tueblingen (DE); Jens Heitkamp, Gaeufelden (DE); Udo Haberland, Holzgerlingen (DE)

(73) Assignee: Agilent Technologies, Inc., Santa Clara, CA (US)

( * ) Notice: Subject to any disclaimer, the term of this patent is extended or adjusted under 35 U.S.C. 154(b) by 17 days.

(21) Appl. No.: 10/529,437

(22) PCT Filed: Sep. 25, 2002

(86) PCT No.: PCT/EP02/10712

§ 371 (c)(1), (2), (4) Date: Aug. 3, 2006

(87) PCT Pub. No.: WO2004/030166

PCT Pub. Date: Apr. 8, 2004

(65) Prior Publication Data

US 2006/0274810 A1    Dec. 7, 2006

(51) Int. Cl.
*H01S 3/08* (2006.01)
*H01S 3/10* (2006.01)

(52) U.S. Cl. ............... 372/102; 372/99; 372/92; 372/20; 372/107

(58) Field of Classification Search ............ 372/92, 372/20, 102, 99, 107
See application file for complete search history.

(56) References Cited

U.S. PATENT DOCUMENTS

| 4,601,036 A | | 7/1986 | Mocker et al. | |
| 4,862,468 A | * | 8/1989 | Fink | 372/19 |
| 4,868,834 A | * | 9/1989 | Fox et al. | 372/20 |
| 5,283,795 A | | 2/1994 | Fink | |
| 5,537,432 A | * | 7/1996 | Mehuys et al. | 372/50.11 |

OTHER PUBLICATIONS

International Search Report dated May 26, 2003.

* cited by examiner

*Primary Examiner*—Minsun Harvey
*Assistant Examiner*—Patrick Stafford

(57) ABSTRACT

A wavelength tunable cavity includes a first reflecting unit adapted to at least partially reflect a beam of electromagnetic radiation towards a second reflecting unit, adapted to at least partially reflect a beam of electromagnetic radiation back towards said first reflecting unit, both reflecting units providing resonance modes of said electromagnetic radiation within said cavity, wherein an optical path of said beam within said cavity is defined in length by said first and second reflecting unit, a grating arranged within said optical path of said beam reflected by said first reflecting unit, said grating adapted for tuning the wavelength of said beam, wherein said at least one second reflecting unit is rotatable about an axis by at least 360 degrees along a circle path with respect to said grating, said circle path including at least a portion arranged to intersect with said beam, which is redirected by said grating.

17 Claims, 9 Drawing Sheets

Fig. 1
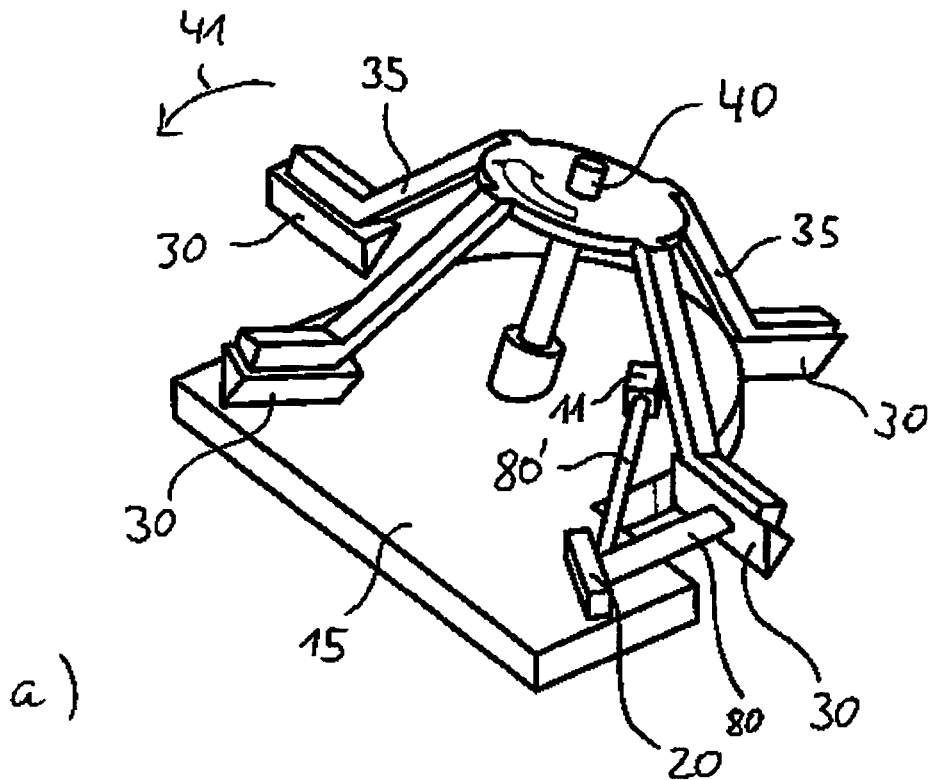
a)
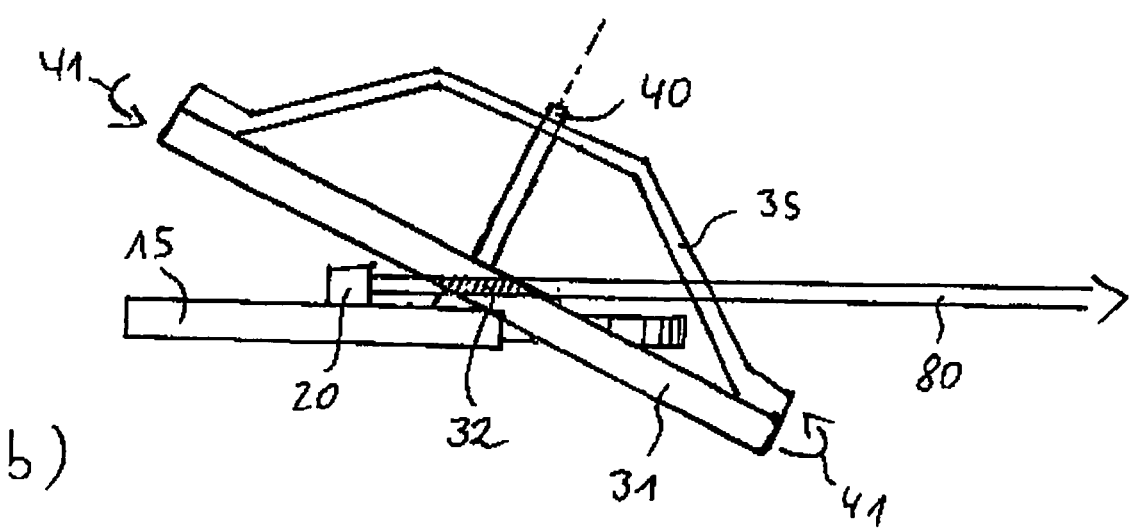
b)

Fig. 5
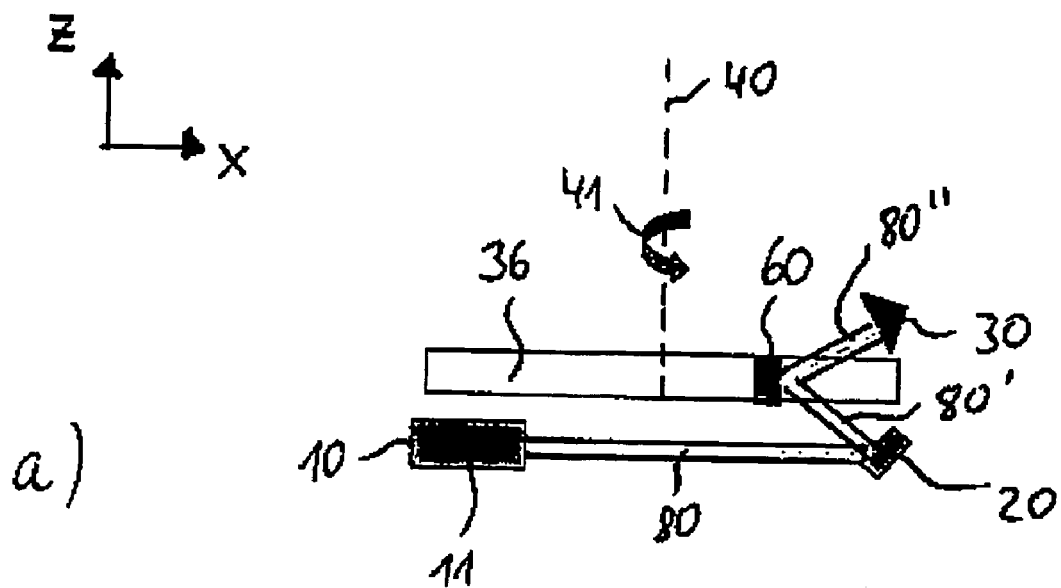
a)
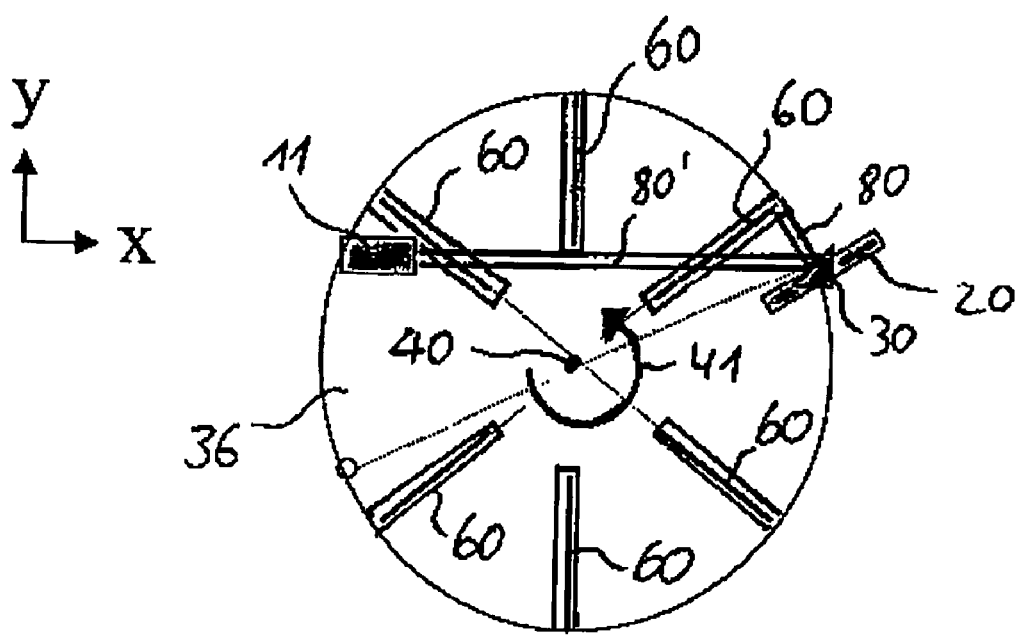
b)

WAVELENGTH TUNABLE CAVITY WITH ROTATIONAL MOVEMENT

This is the National Stage of International application No. PCT/EP2002/010712, filed 25 Sep. 2002.

BACKGROUND OF THE INVENTION

The invention relates to a wavelength tunable cavity. In particular, it relates to a wavelength tunable laser source having an external cavity.

Wavelength tunable laser cavities are playing increasingly important role in industry, particularly in optical communication measurement device industry.

Laser arrangements allowing to provide repetitive wavelength sweeps over a certain wavelength range are known e.g. from U.S. Pat. Nos. 5,283,795, 4,601,036, or U.S. Pat. No. 4,868,834.

SUMMARY OF THE INVENTION

It is an object of the present invention to provide an improved wavelength tunable cavity. It is a particular object of the invention to increase the tuning quality of a cavity. The object is solved by a cavity comprising the features according to the independent claims. Advantageous embodiments of the invention are provided in the dependent claims.

A wavelength tunable cavity according to the present invention comprises a first and a second cavity end mirror, which serve to reflect an incident beam provided by a light source towards each other, respectively. Both mirrors define a cavity having an optical path length. A beam of electromagnetic radiation may be coupled in by means of a beam splitter, a gain medium arranged within the cavity or by means of one or both cavity end mirrors being semitransparent. As a result, resonance modes having a wavelength depending on said optical path length form within the cavity.

A grating serves as a wavelength-tuning filter, e.g. selecting one specific resonance mode out of a series in order to restrict the cavity to a beam having a specific wavelength. The grating is to be arranged within the optical path between said first and second cavity end mirror. The grating redirects the beam reflected by the first cavity end mirror under a redirection angle towards the second cavity end mirror. The angle depends on the wavelength of the beam. The filtered wavelength generally corresponds to that angle, at which the redirected beam is directly reflected back by the second cavity end mirror towards the grating, while portions of said beam having wavelengths differing from the filter wavelength leave the cavity.

The cavity can be tuned in wavelength by extending the optical path length between the first and the second cavity end mirror. According to the present invention the optical path length is varied by providing a movement of the second cavity end mirror or the grating with respect to the respective other optical elements. Such a movement is achieved by arranging at least one of the grating, the second cavity end mirror or a further redirection mirror to be rotatable by at least 360° about a rotation axis. This feature advantageously provides a continuous movement either of the second cavity end mirror or the grating in order to tune the wavelength of the cavity.

Due to the rotation movement about an axis the mirror or the grating is rotated along a circle path. In order to keep the cavity operating, the circle path volume covered by the mirror, a redirection mirror or the grating has to coincide at least in a portion with the optical path of the beam within the cavity.

In a preferred embodiment the rotation axis and the rotation plane, in which the mirror or the grating rotates, coincides with a plane defined by the first and second cavity end mirrors and the grating. A condition that the mirror or the grating along the circle path intersects with the beam along the optical path is then preserved for an extended portion along the circle path. A rotation movement along this portion of the circle path provides a continuous tuning of the cavity, while a movement of the grating or the mirror along a complementary portion along the circle path leads to an interruption of the optical path within the cavity. The beam does not intersect with the mirror or the grating along this complementary portion.

The invention provides the advantage that a tuning movement of the grating or the mirror does not have to be accelerated and stopped in inevitably resulting in a jitter of the tuned wavelength signal. Rather, having, e.g., a constant velocity the grating or the mirror enters the portion of the circle path, where the beam intersects with the mirror or the grating, and then tuning the cavity until it leaves this portion again.

The invention also comprises an arrangement of a cavity, wherein a redirecting mirror is arranged within the optical path being rotatable about an axis for altering the optical path length of the cavity.

The invention also comprises an arrangement, where both, the grating and the second cavity end mirror rotate about an axis, whereby the optical path length of the cavity is changed because the rotating grating is inclined with respect to the beam reflected by the first cavity end mirror thus altering the distance of the first cavity end mirror towards the point, where the beam intersects the grating.

BRIEF DESCRIPTION OF THE DRAWINGS

Other objects and many of the attendant advantages of the present invention will be readily appreciated and become better understood by reference to the following detailed description when considering in connection with the accompanied drawings Features that are substantially or functionally equal or similar will be referred to with the same reference signs.

FIGS. 1-9 display cavities according to embodiments of the present invention.

DETAILED DESCRIPTION OF EMBODIMENTS OF THE INVENTION

Figure 2:
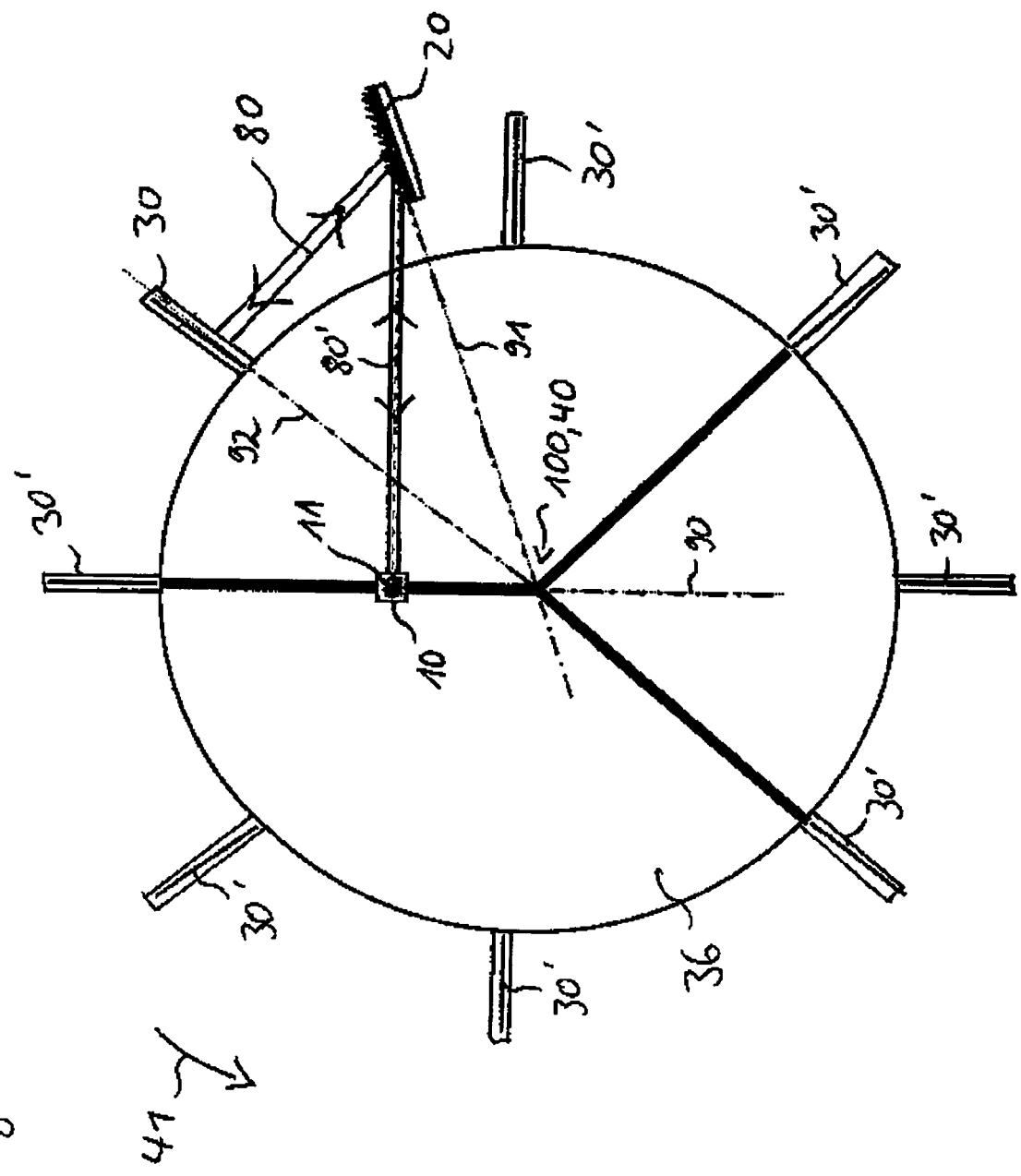

A first embodiment of the present invention is displayed in FIG. 1. As is visible from the three-dimensional view of FIG. 1a a wavelength tunable cavity comprises a laser source 11 emitting a beam 80' towards a grating 20, which redirects the light as a beam 80 having a selected wavelength towards a second cavity end mirror 30. Second cavity end mirror 30 is mounted on an arm 35, which represents a portion of a support being rotatable about an axis 40. The optical path of beams 80', 80 expands a plane, which is parallel to the surface of a socket 15, to which the laser source 11 and the grating 20 is fixed.

For prohibiting an obstruction of second cavity end mirror 30 along its rotation path with grating 20, the rotation axis 40 is inclined with respect to socket 15. As can be seen in FIG. 1b the cycle path 31 of the second cavity end mirror 30 passes a portion 32 of the beam 80, which is redirected by grating 20. During a passage of beam 80 the optical path length of the cavity continuously increases until the beam misses intersecting the second cavity end mirror 30.

A set of four cavity end mirrors 30 is mounted to arms 35 of the rotating support. Thus, for each rotation cycle four scans are performed through the wavelength range provided by portion 32 representing an intersection of beam 80 with second cavity end mirror 30.

Preferably, the rotation velocity of the support around the rotation axis 40 is held constant throughout the tuning movement of the second cavity end mirrors 30.

A second embodiment of the present invention is displayed in FIG. 2. A laser source 11 having a first cavity end mirror as a back facet emits a beam 80' towards a grating 20, which redirects the light as beam 80 having a selected wavelength towards a second cavity end mirror 30, which is mounted to a wheel 36. A set of eight second cavity end mirrors 30, 30' is mounted to wheel 36 in an equidistant fashion.

The arrangement according to FIG. 2 represents a Littmann cavity. i.e., lines 90, 91, 92 extending from the first cavity end mirror 10, the grating 20 and the second cavity end mirror 30 intersect in a pivot point 100. In this embodiment the pivot point 100 coincides with the rotation axis 40 of the wheel, to which the second cavity end mirrors 30 are each mounted. Therefore, a Littmann-condition is preserved for any rotation angle that the wheel 36 acquires. A slight variation of this embodiment is displayed in FIG. 3. The arrangement comprises a mirror folding means 110 for folding the second cavity end mirrors 30, such that these mirrors 30, 30' cannot obstruct with the grating 20, when this grating 20, the second cavity end mirror 30 and the first cavity end mirror 10 of the laser source 11 expand the same plane as the wheel.

To avoid a crash of any of the mirrors with the grating, a control unit checks the position of each cavity end mirror 30', i.e. the current rotation angle, with respect to the position of the grating 20. If a corresponding mirror approaches the grating, a signal is issued initiating the mirror folding means to fold the corresponding second cavity end mirror 30' towards the center of the wheel 36.

Figure 3:
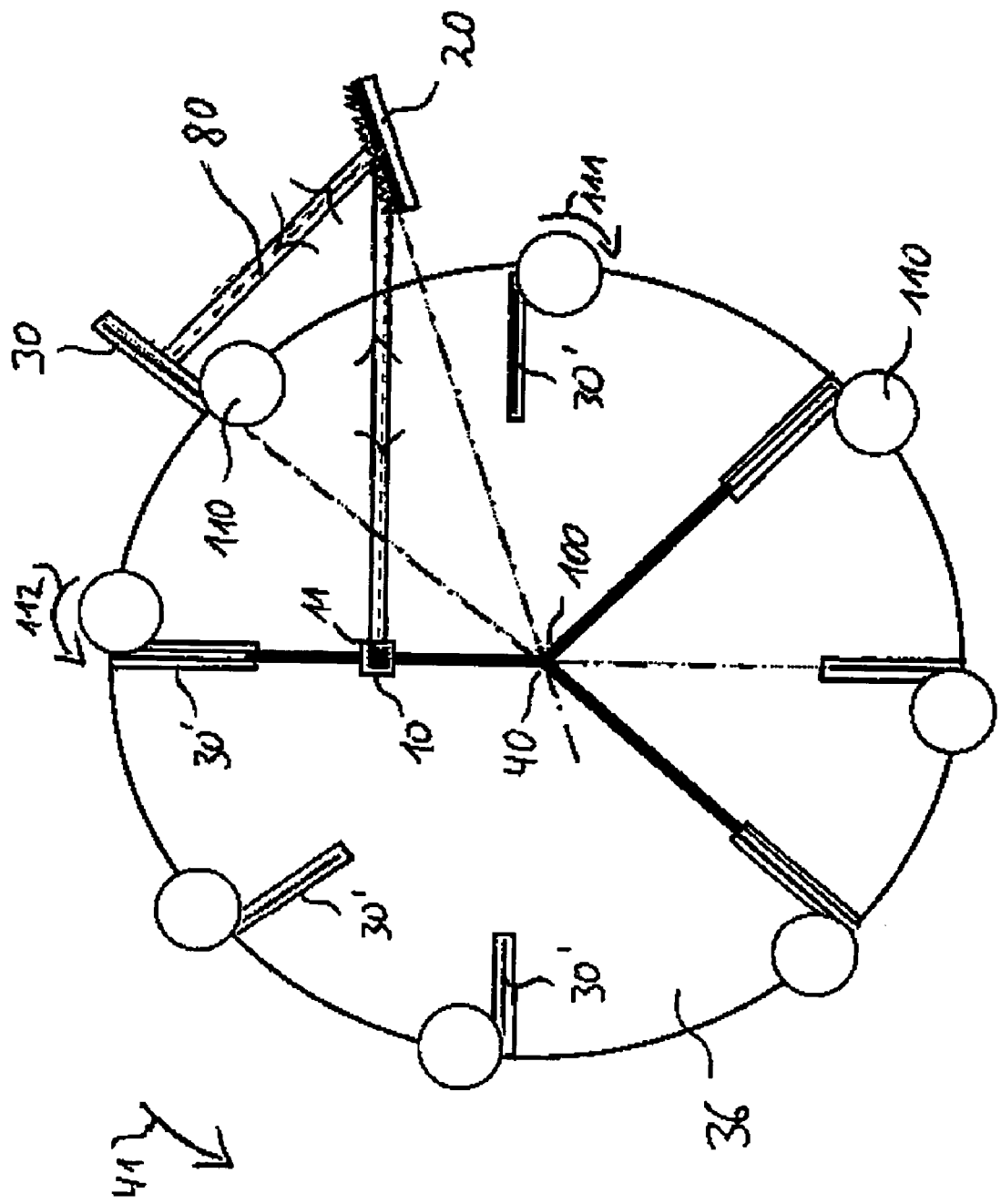
Figure 4:
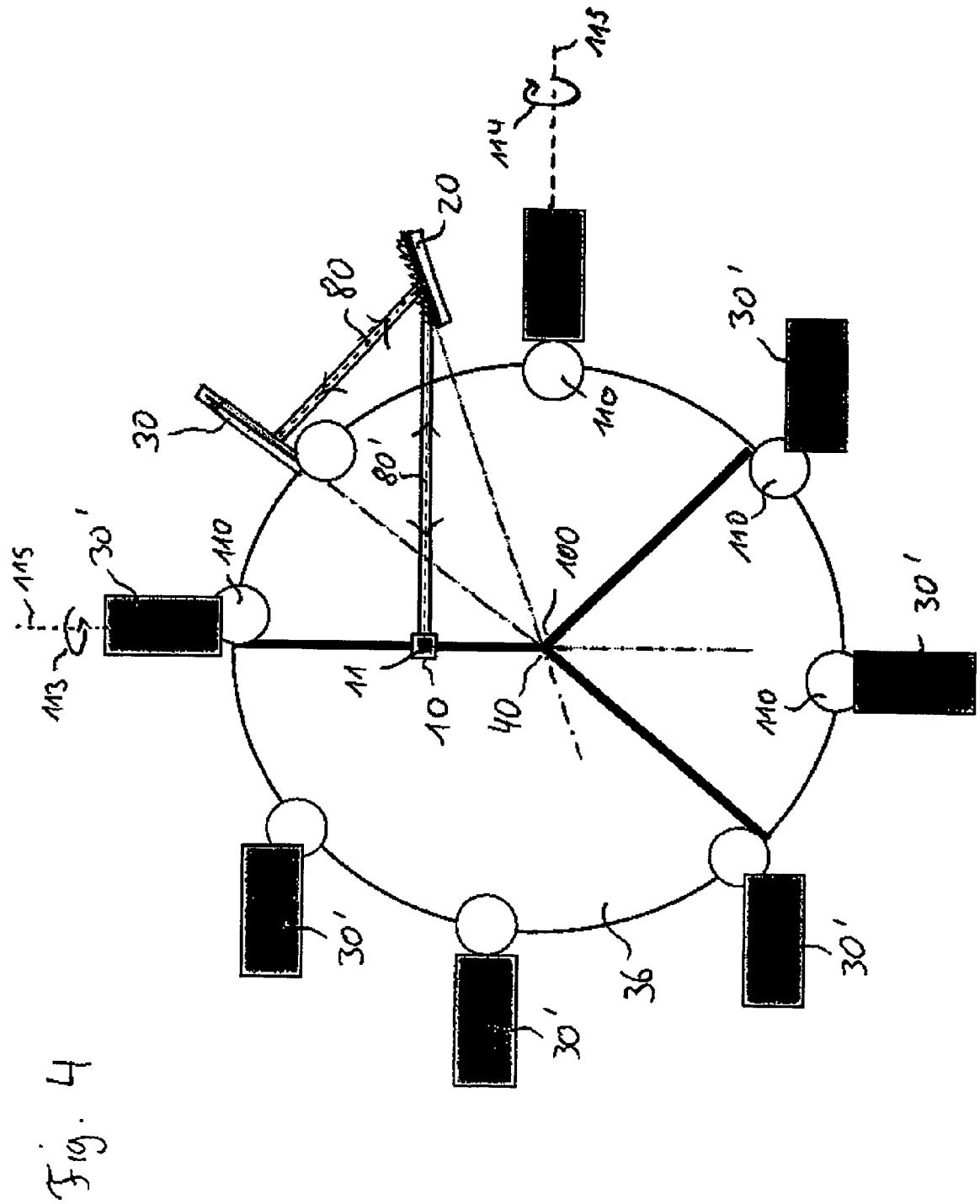

A similar embodiment is displayed in FIG. 4, where the second cavity end mirrors 30' are folded by a rotation movement as opposed to that displayed in FIG. 3.

A third embodiment of the present invention is displayed in FIG. 5. A side view of this embodiment shown in FIG. 5a shows a laser source 11 having a first cavity end mirror 10 as a back facet emitting a beam 80 towards a grating 20. The beam 80 is redirected as a beam 80' having a selected wavelength range towards a redirection mirror 60 which is mounted on a rotating wheel having a rotation axis 40. In this embodiment the optical path, which the beam takes, has a three dimensional curvature, which depends on the current rotation angle of the wheel 36. The optical path length of the cavity is a function of the current rotation angle of the wheel 36.

For increasing the number of cavity tuning scans per cycle of the rotating wheel 36, a set of six redirection mirrors 60 is arranged equidistantly on wheel 36. As a second cavity end mirror 30 a retro-reflector is used in order to compensate maladjustments of the redirection mirrors 60.

Figure 6:
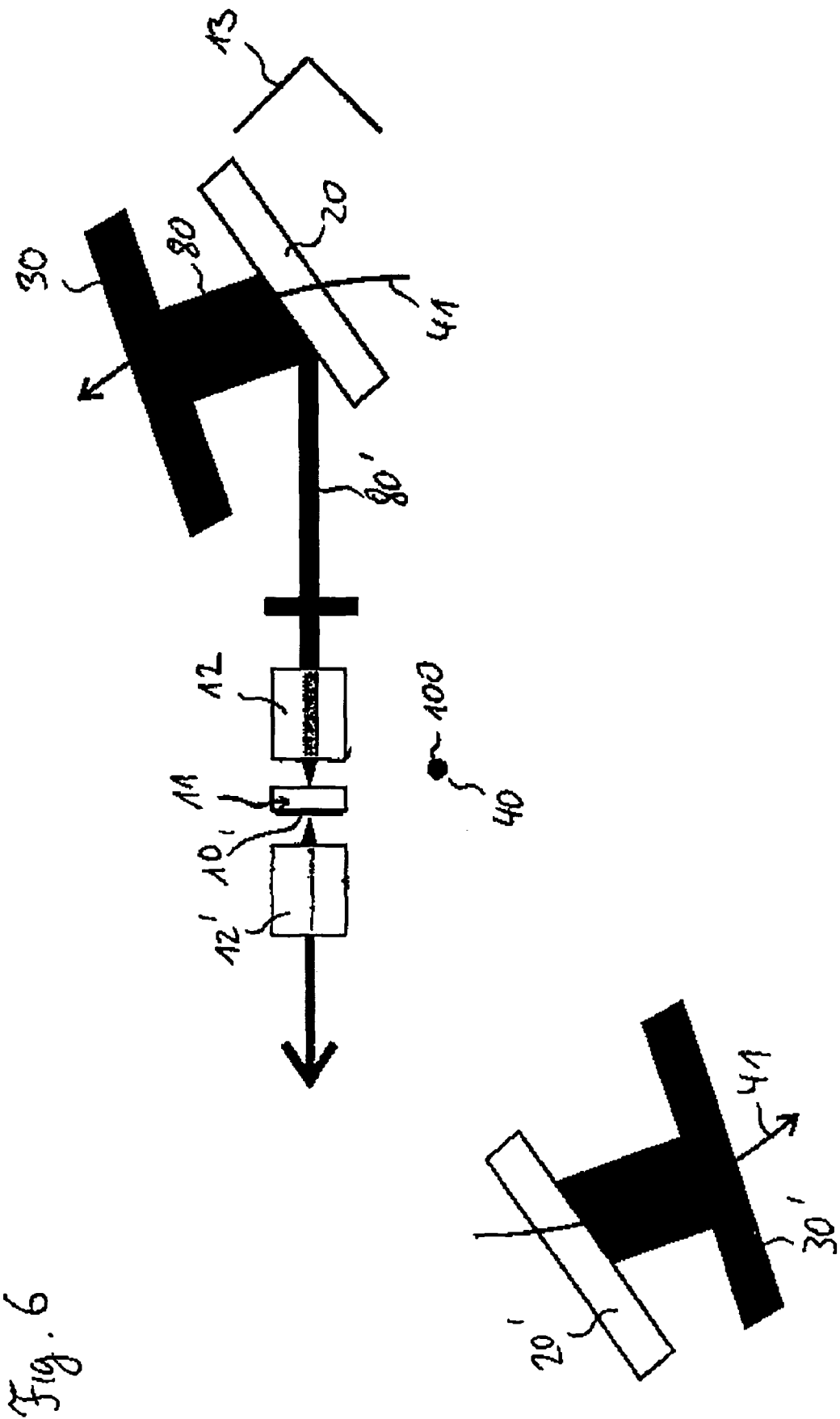

A fourth embodiment of the present invention is shown in FIG. 6. A laser source 11 having a first cavity end mirror 10 as a back facet emits a beam 80' through a collimating lens 12 towards a grating 20 redirecting said beam towards a second cavity end mirror 30. The cavity obeys a Littmann-condition in that a pivot point 100 exists corresponding to intersecting lines 90, 91, 92 extended from the first and second cavity end mirrors 10, 30 and the grating 20.

Both the grating 20 and a second cavity end mirror 30 are mounted on a support, which rotates about an axis 40. The axis coincides with pivot point 100. In particular, a distance between the second cavity end mirror 30 and the grating 20 is held constant throughout the rotation movement. As long as the beam 80' intersects with the grating 20, a Littmann cavity is preserved. A tuning of the cavity wavelength is provided by a variation in optical path length due to an inclination of the grating 20 with respect to the direction of beam 80'. During the scanning movement of the second cavity end mirror 30 and the grating 20 a distance of the first cavity end mirror 10 to the position on the grating 20 defining an intersection of the beam 80' decreases until a lower edge of the grating 20 is reached by the beam 80'. A retro-reflector 13 preserves a laser-condition in case but no grating 20 intersects with beam 80'.

A particular advantage of the present embodiment arises from the fact that no mechanical efforts have to be undertaken in order to circumvent the obstruction of grating 20 with second cavity end mirror 30.

Figure 7:
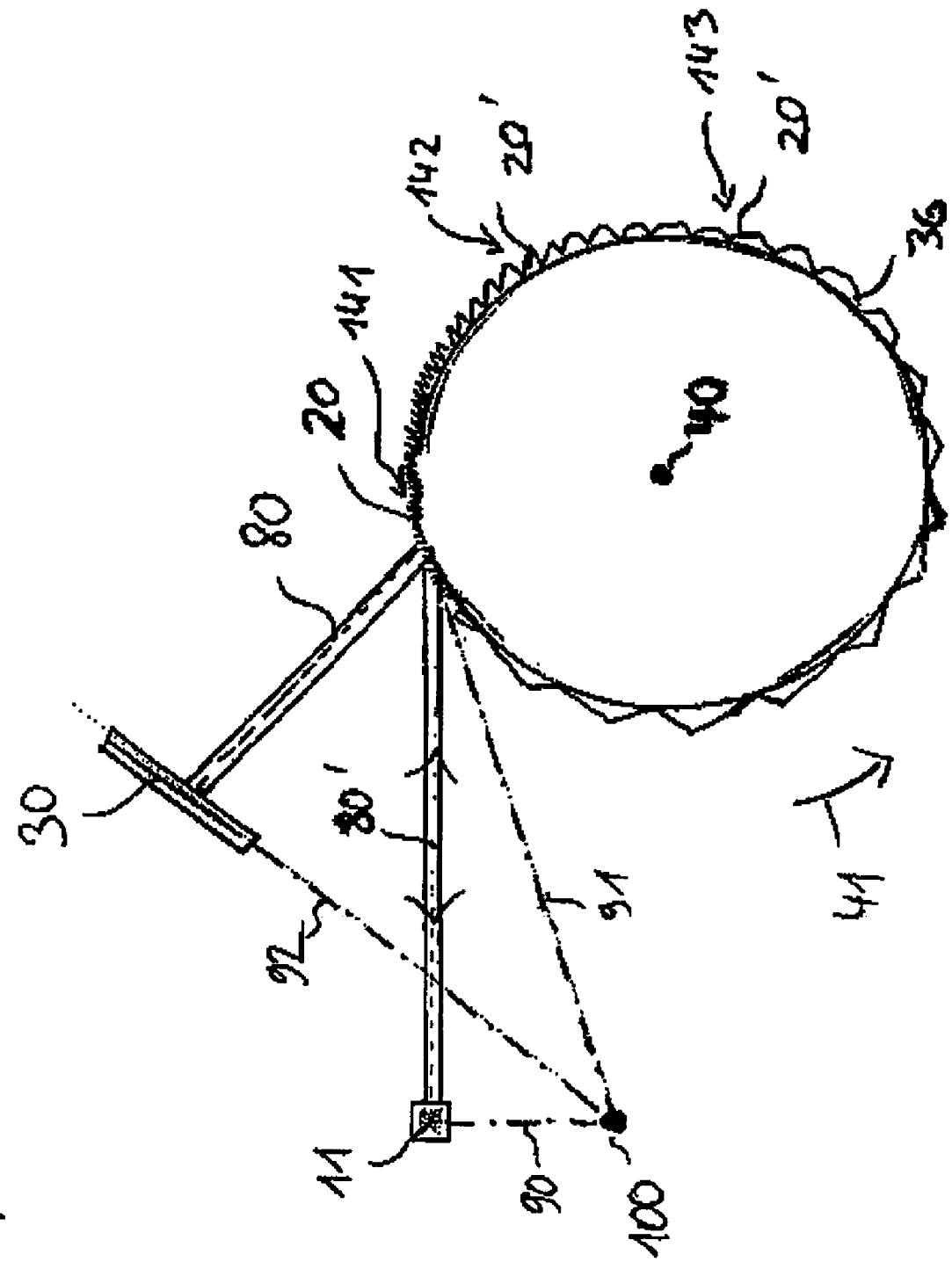
Figure 8:
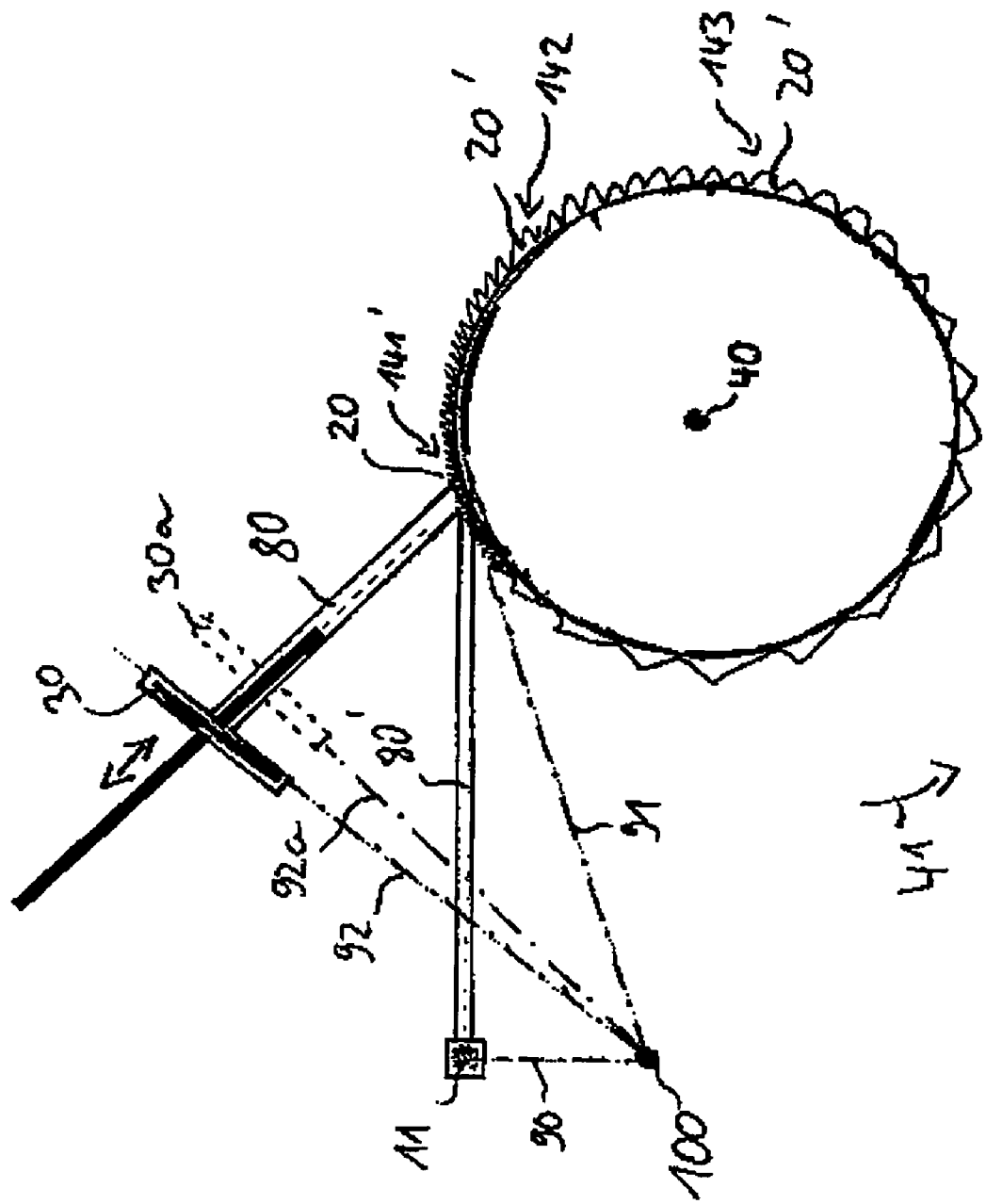

A fifth embodiment of the present invention is displayed in FIG. 7. A laser source 11 emits a beam 80' towards a grating 20 mounted on a wheel 36. The grating 20 extends around the outer surface of wheel 36 having a constantly varying grating constant 141, 142, 143. The wheel 36 rotates around the rotation axis 40 thus varying the grating constant that is active in redirecting the beam 80 towards the second cavity end mirror 30.

In order to preserve a Littmann-condition throughout the rotation 41 of the wheel 36, another control unit can adjust the position of the second cavity end mirror 30. To accomplish this, a drive-rotating wheel 36 as well as a drive adjusting cavity end mirror 30 are connected to said control unit. As the wheel 36 rotates, an active grating constant can be determined by said control unit and the current angle of the cavity end mirror 30 with respect to pivot point 100 can be adjusted in order to tune the wavelength of the cavity.

Figure 9:
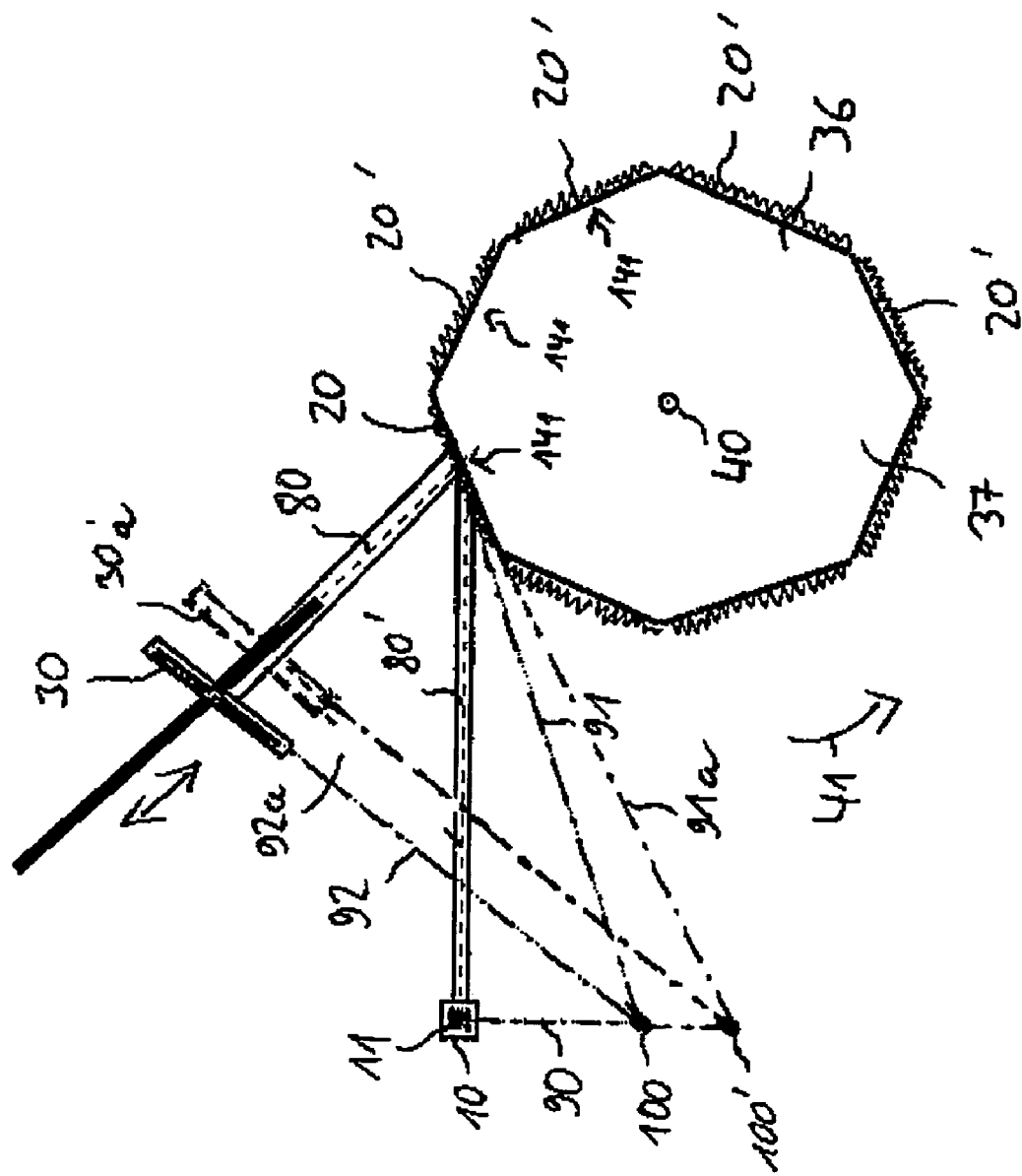

A sixth embodiment of the present invention concerning the case of gratings 20, 20' rotating about an axis 40 is displayed in FIG. 9. An octagon 37 comprising eight gratings 20 is supplied with a beam 80' emitted from a laser source 11. The beam 80 is redirected towards a second cavity end mirror 30, which may be shifted in accordance with the actual rotation angle of the grating 20. The adjustment is carried out to compensate the change of line 91 towards a line 91a defining an extension of grating 20 towards a pivot point 100. Since due to the rotation movement 41 of the octagon the pivot point 100 starts to move towards another position 100' an extension line 92 of the second cavity end mirror 30 has to be shifted to a line 92a running through the new pivot point 100'. As a result the optical path length of beam 80', 80 varies, while a Littmann-condition is still preserved until the next grating 20' becomes the active grating 20, which receives beam 80' from the laser source 11.

The invention claimed is:

1. A cavity, continuously tunable over a wavelength range, comprising:
    a first reflecting unit configured to at least partially reflect an incident beam of electromagnetic radiation towards a second reflecting unit,
    said second reflecting unit configured to at least partially reflect an incident beam of electromagnetic radiation back towards said first reflecting unit, both reflecting units providing the formation of resonance modes of said electromagnetic radiation within said cavity, wherein an optical path of said beam within said cavity is defined in length by said first and second reflecting units, a grating, which is arranged within said optical path of said beam being reflected by said first reflecting unit, said grating configured for tuning the wavelength of said beam, wherein said second reflecting unit is configured to rotate about an axis by at least 360 degrees and provides a continuous movement of said second reflecting unit along a circle path with respect to said grating to continuously vary the optical path length of the cavity, said circle path of said second reflecting unit comprising at least a portion being arranged to intersect with said beam, which is redirected by said grating.

2. A cavity according to claim 1, further comprising a laser source, which comprises a gain medium emitting said beam of electromagnetic radiation through a front surface along said optical path towards said grating, and said first reflecting unit as a back facet.

3. A cavity according to claim 1, wherein said first and second reflecting units and said grating are arranged as a Littmann-cavity comprising a pivot point, said pivot point having a position substantially within said axis of rotation of said second reflecting unit.

4. A cavity according to claim 1, wherein said axis of rotation of said second reflecting unit is arranged being substantially orthogonal to a plane defined by said first and second reflecting unit and said grating.

5. A cavity, continuously tunable over a wavelength range, comprising:

a first reflecting unit configured to at least partially reflect an incident beam of electromagnetic radiation towards a second reflecting unit, the said second reflecting unit configured to at least partially reflect an incident beam of electromagnetic radiation towards said first reflecting unit, both reflecting units providing the formation of resonance modes of said electromagnetic radiation within said cavity, wherein an optical path of said beam within said cavity is defined in length by said first and second reflecting units, at least one grating configured to redirect said optical path of said beam being reflected by said first reflecting unit towards said second reflecting unit, and configured to tune the wavelength of said beam, wherein said at least one grating is configured to rotate along a circle path about an axis by at least 360 degrees and provides a continuous movement with respect to said first and second reflecting unit to continuously vary the optical path length of the cavity, said circle path of said at least one grating comprising at least a portion being arranged to intersect with said beam, which is reflected by said first reflecting unit.

6. A cavity according to claim 5, further comprising a laser source, which comprises a gain medium emitting said beam of electromagnetic radiation through a front surface along said optical path towards said grating, and said first reflecting unit as a back facet.

7. A cavity according to claim 5, comprising a first and at least one second grating, both gratings being rotatable about the same axis by at least 360 degrees, the first grating having a first grating constant and the second grating having a second grating constant, which is different from said first grating constant, both gratings adapted to redirect said beam being reflected by said first reflecting unit towards said second reflecting unit.

8. A cavity according to claim 5, comprising a multiple of gratings each being mounted to a rotatable support, and each of said gratings comprising:

the same axis of rotation, and the same circle path comprising the same portion being arranged to intersect with said beam, which is reflected by said first reflecting unit.

9. A cavity, continuously tunable over a wavelength range, comprising:

a first reflecting unit configured to at least partially reflect an incident beam of electromagnetic radiation towards a second reflecting unit, the second reflecting unit configured to at least partially reflect an incident beam of electromagnetic radiation towards said first reflecting unit, both reflecting units providing the formation of resonance modes of said electromagnetic radiation within said cavity, wherein an optical path of said beam within said cavity is defined in length by said first and second reflecting unit, a grating configured to redirect said optical path of said beam being reflected by said first reflecting unit towards said second reflecting unit, and configured to tune the wavelength of said beam by means of diffraction, a redirection reflecting unit adapted to redirect said optical path of said beam, which is redirected from said grating towards said second reflecting unit, wherein said redirection reflecting unit is configured to rotate along a circle path about an axis by at least 360 degrees for providing a continuous movement with respect to said grating and said second reflecting unit to continuously tune the cavity over a wavelength range by varying the optical path length of the cavity, said circle path of said redirection reflecting unit comprising at least a portion being arranged to intersect with said beam, which is redirected by said grating.

10. A cavity, continuously tunable over a wavelength range, comprising:

a first reflecting unit configured to at least partially reflect an incident beam of electromagnetic radiation towards at least one second reflecting unit, said second reflecting unit configured to at least partially reflect an incident beam of electromagnetic radiation towards said first reflecting unit, both reflecting units providing the formation of resonance modes of said electromagnetic radiation within said cavity, wherein an optical path of said beam within said cavity is defined in length by said first and second reflecting units, a grating, which is arranged within said optical path of said beam being reflected by said first reflecting unit, said grating configured for tuning the wavelength of said beam, wherein said second reflecting unit and said grating are both configured to rotate along a circle path about an axis by at least 360 degrees and provide a continuous movement with respect to said grating to continuously vary the optical path length of the cavity, said circle path of said grating comprising at least a portion being arranged to intersect with said beam, which is reflected by said first reflecting unit.

11. A cavity according to claim 10, further comprising a laser source, which comprises:

a gain medium emitting said beam of electromagnetic radiation through a front surface along said optical path towards said grating, and said first reflecting unit as a back facet.

12. A method of continuously tuning a cavity over a wavelength range, comprising:

at least partially reflecting an incident beam of electromagnetic radiation from a first reflecting unit towards a second reflecting unit, at least partially reflecting an incident beam of electromagnetic radiation from said at least one second reflecting unit back towards said first reflecting unit, both reflecting units providing the formation of resonance modes of said electromagnetic radiation within said cavity, wherein an optical path of said beam within said cavity is defined in length by said first and second reflecting units, tuning the wavelength of said beam by using a grating, which is arranged within said optical path of said beam being reflected by said first reflecting unit, rotating said at least one second reflecting unit about an axis by at least 360 degrees for providing a continuous movement of said second reflecting unit along a circle path with respect to said grating for continuously varying the optical path length of the cavity, said circle path of said second reflecting unit comprising at least a portion being arranged to intersect with said beam, which is redirected by said grating.

13. A cavity, continuously tunable over a wavelength range, comprising:

a first reflecting unit configured to at least partially reflect an incident beam of electromagnetic radiation towards a second reflecting unit, wherein said second reflecting unit is configured to at least partially reflect the incident beam of electromagnetic radiation back towards said first reflecting unit, both reflecting units providing the formation of resonance modes of said electromagnetic radiation within said cavity, and an optical path of said beam within said cavity is defined in length by said first and second reflecting units, a grating arranged within said optical path and configured for tuning the wavelength of said beam, wherein at least one element of a group comprising the first reflecting unit, the second reflecting unit, and the grating is configured to rotate about an axis by at least 360 degrees and provide a continuous movement of said element along a circle path with respect to at least one of the other elements to continuously vary the optical path length of the cavity, and wherein said circle path comprises at least a portion being arranged to intersect with said beam.

14. The cavity of claim 13, wherein at least one of the first and second reflecting units comprise a redirection reflecting unit adapted to redirect said optical path with respect to said reflecting unit, and wherein said redirection reflecting unit is arranged being rotatable along the circle path.

15. The cavity of claim 13, wherein said first and second reflecting units and said grating are arranged as a Littmann-cavity comprising a pivot point, said pivot point having a position substantially within said axis of rotation of said second reflecting unit.

16. A cavity according to claim 1, wherein at least one of the reflecting units comprises at least one of: a mirror, a plan mirror, a cavity end mirror, a retro-reflecting unit.

17. A method comprising:

at least partially reflecting an incident beam of electromagnetic radiation in a cavity between a first and a second reflecting unit, providing the formation of resonance modes of said electromagnetic radiation within said cavity, wherein an optical path of said beam within said cavity is defined in length by said first and second reflecting units, arranging a grating within said optical path for tuning the wavelength of said beam, rotating at least one element of a group comprising the first reflecting unit, the second reflecting unit, and the grating about an axis by at least 360 degrees for providing a continuous movement of said element along a circle path with respect to at least one of the other elements to continuously tune the cavity over a wavelength range by varying the optical path length of the cavity, wherein said circle path comprises at least a portion being arranged to intersect with said beam.

* * * * *